A. E. COOK AND T. VAN TUYL.
SPEED REDUCTION WHEEL.
APPLICATION FILED JUNE 14, 1918.
1,397,366.
Patented Nov. 15, 1921.
3 SHEETS—SHEET 2.
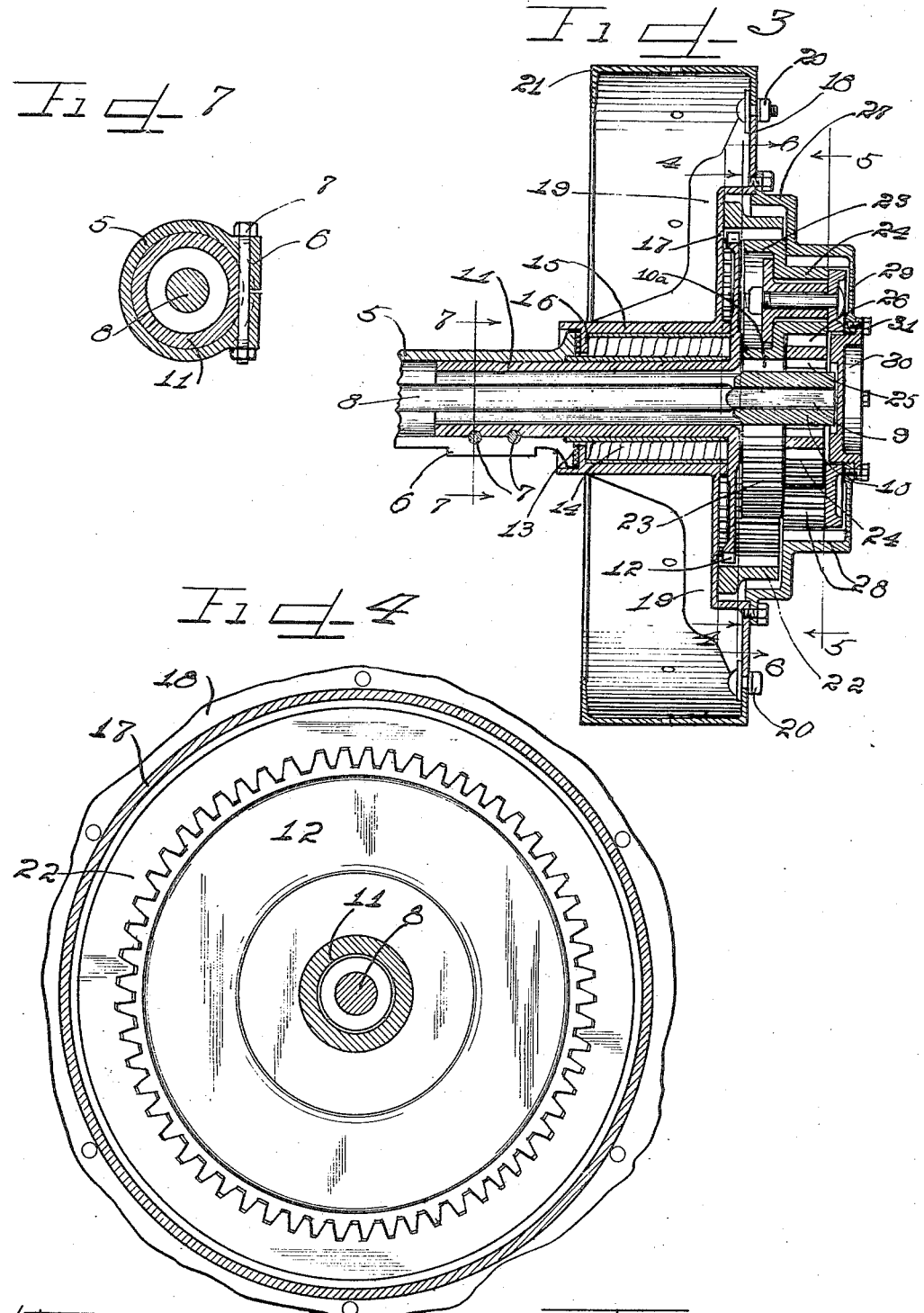

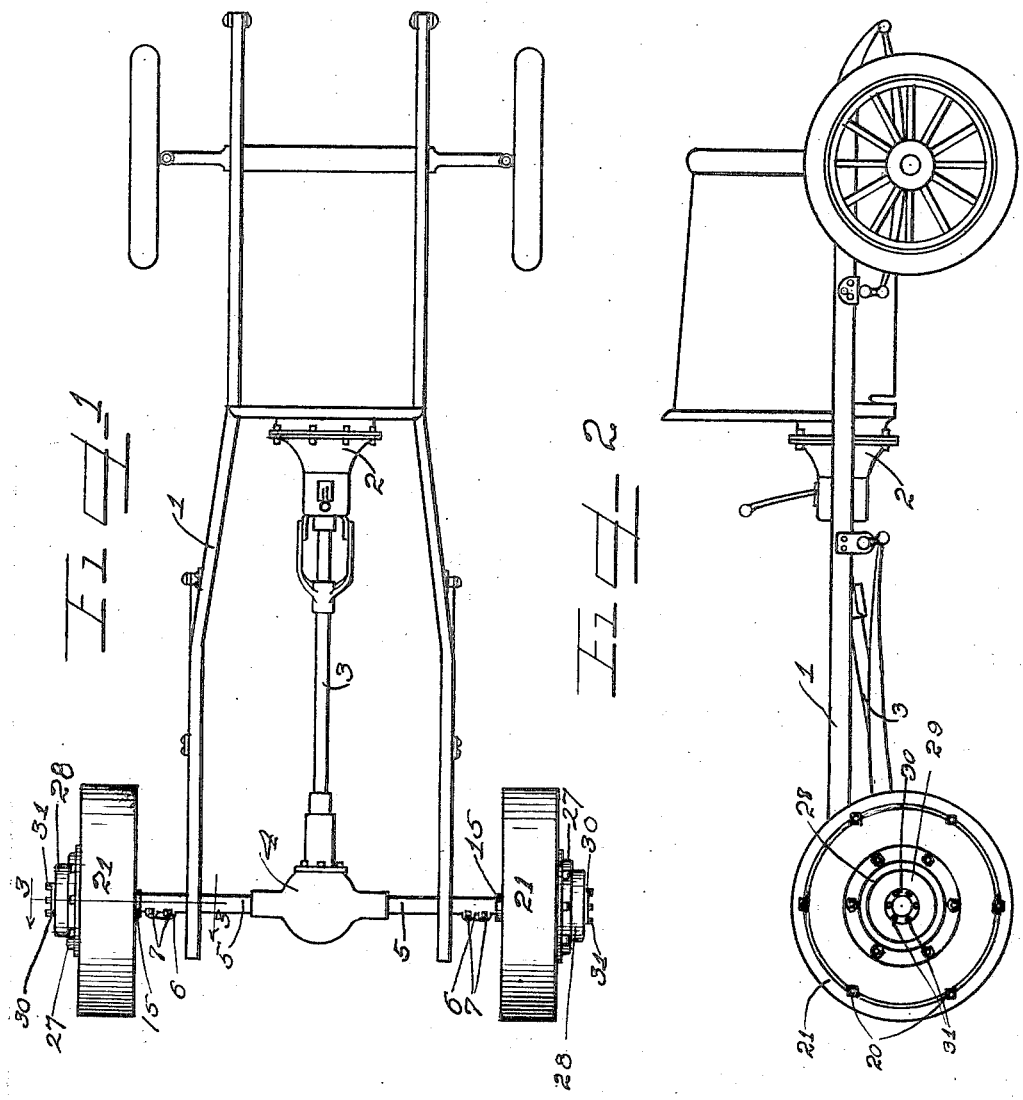

A. E. COOK AND T. VAN TUYL.
SPEED REDUCTION WHEEL.
APPLICATION FILED JUNE 14, 1918.

1,397,366.

Patented Nov. 15, 1921.

Witnesses

Inventors
Albert E. Cook
Thomas Van Tuyl
By Charles Hill Atty.

UNITED STATES PATENT OFFICE.

ALBERT E. COOK, OF EVANSTON, AND THOMAS VAN TUYL, OF KANKAKEE, ILLINOIS; SAID VAN TUYL ASSIGNOR TO SAID COOK.

SPEED-REDUCTION WHEEL.

1,397,366.     Specification of Letters Patent.     Patented Nov. 15, 1921.

Application filed June 14, 1918. Serial No. 240,098.

*To all whom it may concern:*

Be it known that we, ALBERT E. COOK and THOMAS VAN TUYL, citizens of the United States, and residents of the city of Evanston, in the county of Cook and State of Illinois, and city of Kankakee, in the county of Kankakee and State of Illinois, respectively, have invented certain new and useful Improvements in a Speed-Reduction Wheel; and we do hereby declare that the following is a full, clear, and exact description of the same, reference being had to the accompanying drawings, and to the numerals of reference marked thereon, which form a part of this specification.

This invention relates to an improved form of speed reducing wheel adaptable for use on a power driven vehicle or machine, to permit the vehicle or machine to be driven at a rate of speed different from that transmitted thereto.

It is an object of this invention to construct a wheel equipped with a speed change mechanism which is accessible without requiring removal of the wheel from its mounting.

It is also an object of the invention to construct a speed change wheel adaptable for use on a vehicle or machine and affording easy access to the change speed mechanism thereof by the removal of a closure plate.

It is a further object of this invention to provide a tractor wheel for use on a vehicle or machine, said wheel having a change speed mechanism mounted on the outer side thereof to facilitate cleaning and repairs and affording easy access to the driving member to permit removal and reversal thereof to effect a speed reduction different from the speed reduction produced by the driving member before reversal thereof.

It is furthermore an object of this invention to provide a speed change wheel for use on a vehicle to change the driving speed thereof, said wheel having the speed change gearing disposed to the outside of the wheel and inclosed by a drum easily removable to permit access to the speed change gearing without requiring removal of the wheel from the driving axle of the vehicle.

A further object of the invention is the construction of a speed change wheel provided with a dust proof and oil retaining gear casing.

Another object of the invention is the construction of a speed change wheel equipped with a gear mechanism permitting a multiple compound equalized use of the teeth of said gear mechanism.

It is also an object of this invention to provide a wheel with a balanced floating gear mechanism adapted to afford a different speed reduction of a drive imparted thereto, by the simple reversal of the driving member as a unit.

It is an important object of this invention to provide an improved form of speed change wheel of simple and effective construction adapted to be readily mounted upon the driving axle of a vehicle or upon a machine and further adapted to have the speed changing parts thereof removed, adjusted or cleaned without requiring removal of said wheel from its mounting.

Other and further important objects of this invention will be apparent from the disclosures in the specification and drawings.

The invention (in a preferred form) is illustrated in the drawings and hereinafter more fully described.

On the drawings:—

Figure 1 is a top plan view of an automobile chassis equipped with speed reduction wheels embodying the principles of this invention.

Fig. 2 is a side elevation thereof.

Fig. 3 is an enlarged section taken on line 3—3, of Fig. 1, with parts shown in elevation.

Fig. 4 is an enlarged sectional view taken on line 4—4 of Fig. 3.

Fig. 7 is an enlarged detail section taken on line 7—7 of Fig. 3.

As shown on the drawings:—

Figure 5:
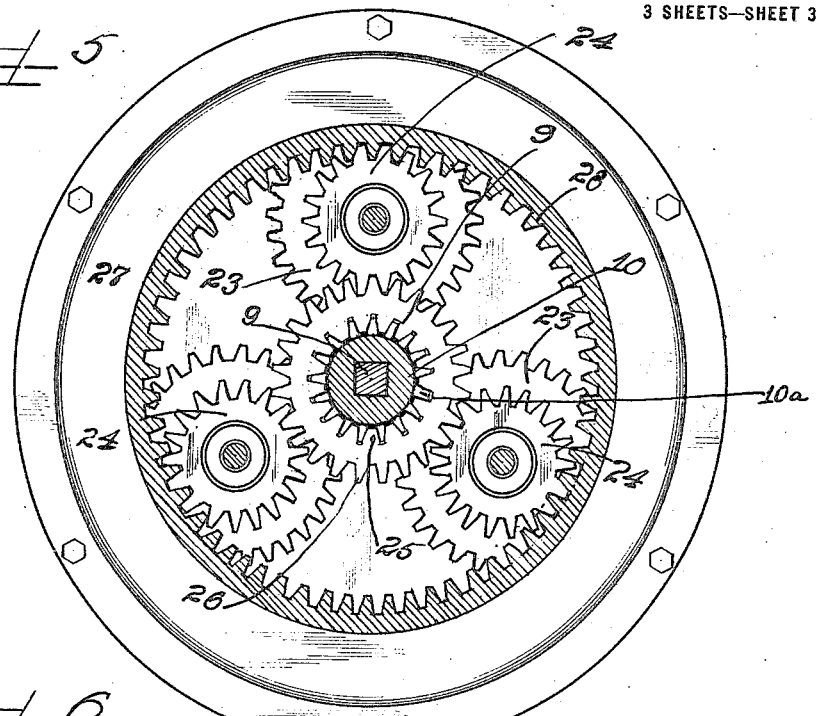
Fig. 5 is an enlarged sectional view taken on line 5—5 of Fig. 3.
Figure 6:
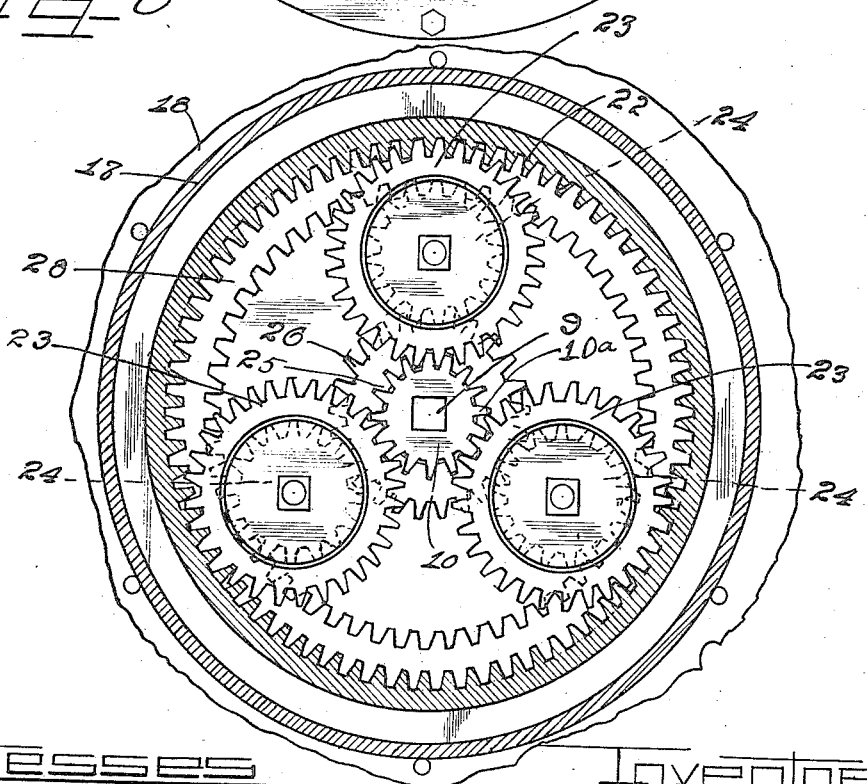
Fig. 6 is an enlarged section taken on line 6—6 of Fig. 3.

The reference numeral 1, indicates an automobile chassis, equipped with an engine 2, a driving shaft 3, a differential 4, and axle sleeves 5, the outer ends of which are split and provided with passaged extensions 6, for receiving clamping bolts 7. Disposed in each of the sleeves 6, with the inner end thereof connected with the differential is a driving axle 8, the outer portion 9, of which is of square cross-section to removably receive a driving member 10, having a driving gear 10ª, integrally formed at one end thereof. Projecting into the outer end of each of the axle sleeves 5, and rigidly held clamped in position therein by means of the bolts 7, is a sleeve or hub member 11, which projects outwardly beyond the end of the respective axle sleeve 5, and has integrally formed at right angles to the outer end thereof a large stationary clutch 12. Mounted upon the hub 11, between the large clutch 12, and a washer 13, disposed adjacent the outer end of the axle sleeve 5, is a roller bearing 14, upon which is rotatably mounted a wheel drum embracing a cylindrical collar 15, provided with an inwardly directed flange ring 16, which engages between the inner end of the roller bearing 14, and the washer 13. Integrally formed at right angles to the outer portion of the collar 15, is an inner casing member 17, provided with an integral flange rim or ring 18. Integrally formed upon the collar 15, and on the rear or inner surfaces of the casing member 17, and the flange ring 18, are a plurality of reinforcing ribs 19. Rigidly secured by means of bolts 20, or other suitable means to the flange ring 18, of the wheel drum is the outer flange of a channel cross-sectioned wheel rim 21.

Disposed within the inner casing member 17, and meshing with the large stationary clutch 12, is a large internal gear 22, which is held against rotation in a compensating position by the large stationary clutch 12. The internal gear 22, projects outwardly from said inner casing member and has meshing therewith a plurality of large gears 23, which are integrally connected with axially alined small gears 24, forming floating double gear members. Removably engaged around the outer portion of the driving member 10, is a gear ring comprising a clutch 25, and an integral external gear 26, the teeth of which are in mesh with the small gears 24, of the double floating gear members. Removably secured to the flange 18, of the inner casing member is an outer casing member 27, which incloses the large internal gear 22, and the large gears 23. Said outer casing member 27, has integrally formed thereon an internal gear 28, of a diameter less than that of the internal gear 22. Said internal gear 28, meshes with the small gears 24, and is provided with an integral end plate 29, having a large central opening therein which is closed by means of a closure plate or cup 30, removably secured in position by means of bolts 31. As clearly shown in Fig. 3, the casing inclosing the change speed gear mechanisms is disposed to the outside of the wheel proper thereby affording an arrangement permitting easy access to said gear mechanisms by removing the closure plate 30, and if necessary the outer casing member, without necessitating removal of the entire wheel. It will furthermore be noted that the entire wheel may be removed with one operation by simply removing the clamping bolts 7. The construction of the casing inclosing the speed change gear mechanisms is such that oil is prevented from leaking therefrom, and it is practically impossible for dust to enter said casing.

The operation is as follows:—

When the engine 2, is started a drive is transmitted to the driving shaft 3, the differential 4, and the driving axles 8, and the driving members 10, secured on the squared ends 9, of said axles.

By referring to Fig. 3, it will be seen that the driving gear 10ª, normally is in mesh with the large floating gears 23, and held in a balanced position thereby. Said gears 23, are consequently rotated, causing rotation of the small gears 24, which mesh with the external gear 26, of said combined clutch and gear ring. The large gears 23, which are in mesh with the large stationary internal gear 22, travel around said internal gear, thereby rotating the internal gear 28, by means of the rotating small gears 24, in mesh therewith. Rotation of the internal gear 28, causes rotation of the drum casing 17—27, and the wheel rim 21, secured to said casing.

Due to the arrangement of the speed change gear mechanism of the tractor wheel the same is rotated at a speed different from that transmitted to it by the engine of the automobile. As a result of the above construction, the automobile is driven at a reduced rate of speed.

From the construction of the improved form of tractor wheel as shown and described, it will be noted that an entire tractor wheel may be readily removed from the automobile in a very short time by simply removing the clamping bolts 7, and pulling the wheel off of the driving axle. It will further be noted that when the tractor wheel is mounted in position that access to the speed gear mechanisms may be had by simply removing the closure plate 30, and if necessary the outer casing member 27, without requiring removal of the tractor wheel from the driving axle. The accessibility of the speed change mechanisms is permitted since said speed change mechanisms are all mounted within the casing 17—27, which is disposed to the outside of the tractor wheel. The removal of the closure plate 30, and the outer casing member 27, permits reversal of the driving member, and if desired, removal and replacement of the double gear members to effect different speed reductions.

Attention is particularly called to the fact that by removing the closure plate 30, the driving member 10, may be removed and inverted as a unit, into a position wherein the teeth of the driving gear 10ª, interfit with the teeth of the internal clutch 25, thus affording an arrangement whereby the drive is first imparted to the combined clutch and gear ring 25—26, which in turn transmits the drive to the small gears 24, of the double floating gear members, which impart a reduced speed to the internal gear 28, which reduced speed is different from that produced when the driving gear 10ª, is in normal position in mesh with the large gears 23, of the double gear members.

We are aware that numerous details of construction may be varied through a wide range without departing from the principles of this invention, and we therefore do not purpose limiting the patent granted otherwise than necessitated by the prior art.

We claim as our invention:—

1. A tractor wheel comprising a hub, clutch means formed thereon, a drum casing rotatably mounted upon said hub, a rim secured thereto, an internal gear ring in said drum casing, held against rotation by said clutch means, an internal gear forming a part of said drum casing, and floating gear mechanisms in mesh with said internal gear ring and with the internal gear of said drum casing to effect a changed drive for said tractor wheel.

2. A tractor wheel comprising a hub, a clutch integrally formed at the outer end thereof, a drum casing rotatably mounted upon said hub, a rim secured thereto, an internal gear ring in said drum casing meshing with and held against rotation by said clutch, an internal gear forming a part of said drum casing, gear mechanisms in mesh with said internal gear ring and with the internal gear of said drum casing, and gear members meshing with said gear mechanisms.

3. The combination with an automobile driving axle, of a driving member thereon, a hub surrounding said axle, a clutch integrally formed at the outer end of said hub, a drum casing rotatably mounted upon said hub, an internal gear ring adjustably disposed in said drum casing meshing with and held from rotating by said clutch, an internal gear formed within said drum casing, floating double gear mechanisms in mesh with said internal gear ring and with the internal gear of said drum casing, and a combined clutch and gear member in mesh with said floating gear mechanisms, said driving member adapted to be positioned to mesh with said floating gear mechanisms or with said combined clutch and gear member whereby a drive from said axle is transmitted to said wheel rim at a reduced rate of speed.

4. The combination with an automobile axle and a driving member thereon, of a wheel, speed reduction gear mechanism therein in mesh with said driving member to effect a speed reduction, and a double gear member in mesh with said speed reduction gear mechanism, said driving member adapted to be removed and inverted as a unit to lockingly engage said double gear member to effect a speed reduction different from that first produced.

5. The combination with an automobile axle and an axle sleeve, of a driving gear reversibly engaged on said axle, a hub removably secured in said axle sleeve, a clutch integrally formed on the outer end of said hub, a roller bearing on said hub to the inside of said clutch, a wheel rotatably mounted thereon, a casing formed on said wheel to the outer side thereof, and speed reduction mechanisms therein connected with said driving gear and with said clutch whereby a drive from said axle is transmitted to said wheel at a rate of speed different from that of the axle.

6. The combination with an automobile driving axle and the axle sleeve, of a driving gear member on said axle, a hub member removably secured in said axle sleeve, a drum rotatably mounted on said hub, an inner casing member integrally formed thereon, a wheel rim secured thereto, an internal gear connected with said hub and held in position thereby, an outer casing member removably secured to said inner casing member, an internal gear formed in said outer casing member, gear means disposed between said inner and outer casing members and meshing with said stationary internal gear and with the internal gear in said outer casing member, and a combined clutch and gear member embracing an internal clutch in mesh with said driving gear and the external gear which is in mesh with said gear means whereby a drive from said axle is transmitted to said wheel rim at a reduced rate of speed.

7. The combination with an automobile driving axle and the sleeve thereof, of a tractor wheel removably secured to said sleeve, gear mechanisms therein, a driving member disposed between said driving axle and said gear mechanisms to receive a drive from said axle and transmit the same to said tractor wheel at a changed rate of speed, and removable means inclosing said gear mechanisms permitting access thereto without necessitating the removal of said tractor wheel from said sleeve, said driving member adapted to be reversed from normal position to engage said gear mechanisms to effect a different speed reduction.

8. The combination with a driving means, of a speed reducing mechanism associated therewith, a combined clutch and gear member engaged therewith, and a removable reversible driving member adapted to be engaged on said driving means to engage said combined clutch and gear member or in a reversed position to engage said speed reducing mechanism to effect a different speed reduction in each position thereof.

9. The combination with a rotatable and a non-rotatable internal gear, of speed reduction mechanisms disposed between and engaged with said internal gears, and a driving member adapted to be reversed as a unit to engage with either of said speed reduction mechanisms to effect different speed reductions.

In testimony whereof we have hereunto subscribed our names in the presence of two subscribing witnesses.

ALBERT E. COOK.
THOMAS VAN TUYL.

Witnesses:
FRANK A. BREMER, Jr.,
FRED E. PAESLER.